US007617009B2

(12) United States Patent
Hirose et al.

(10) Patent No.: US 7,617,009 B2
(45) Date of Patent: Nov. 10, 2009

(54) REMOTE CONTROL SYSTEM AND REMOTE CONTROL METHOD

(75) Inventors: Koji Hirose, Osaka (JP); Ryuichi Sakai, Osaka (JP); Takashi Maniwa, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 10/550,614

(22) PCT Filed: Mar. 26, 2004

(86) PCT No.: PCT/JP2004/004266

§ 371 (c)(1),
(2), (4) Date: Feb. 1, 2006

(87) PCT Pub. No.: WO2004/086239

PCT Pub. Date: Oct. 7, 2004

(65) Prior Publication Data

US 2006/0192790 A1 Aug. 31, 2006

(30) Foreign Application Priority Data

Mar. 27, 2003 (JP) ............................ 2003-088422

(51) Int. Cl.
*G05B 11/01* (2006.01)
*G05B 15/00* (2006.01)

(52) U.S. Cl. .......................................... 700/17; 700/83

(58) Field of Classification Search .................. 700/17, 700/83

See application file for complete search history.

(56) References Cited

U.S. PATENT DOCUMENTS 6,161,133 A * 12/2000 Kikinis ....................... 709/220
6,195,501 B1 * 2/2001 Perry et al. .................... 386/83
6,615,088 B1 * 9/2003 Myer et al. .................... 700/20
6,704,401 B2 * 3/2004 Piepho et al. .......... 379/102.03

(Continued)

FOREIGN PATENT DOCUMENTS

JP 9-319687 12/1997

(Continued)

OTHER PUBLICATIONS

U.S. Appl. No. 10/151,635; Specification Whole Document; 30 pages.*

(Continued)

*Primary Examiner*—Ronald D Hartman, Jr.
(74) *Attorney, Agent, or Firm*—Greenblum & Bernstein, P.L.C.

(57) ABSTRACT

A remote control system in which an instruction from a remote terminal is transmitted to a controlled device through a remote control device. Device unique data which is information specific to the controlled device is stored in the remote control device or the controlled device. The remote control device generates WEB display data to be displayed on the remote terminal based on a device type of the controlled device and the device unique data. Alternatively, the remote control device generates WEB display data based on the device unique data stored in the controlled device. Thus, even when a new type of controlled device is developed, or even when the function for the controlled device is extended, it does not need to modify programs for achieving functions of the remote control device. Accordingly, it facilitates a change of an operational screen of the terminal in response to those changes.

12 Claims, 7 Drawing Sheets

U.S. PATENT DOCUMENTS

| | | | | |
|---|---|---|---|---|
| 6,722,784 | B2 * | 4/2004 | Breil, Jr. | 383/61.2 |
| 6,725,281 | B1 * | 4/2004 | Zintel et al. | 719/318 |
| 6,788,241 | B2 * | 9/2004 | Arling et al. | 341/176 |
| 6,924,727 | B2 * | 8/2005 | Nagaoka et al. | 340/3.1 |
| 6,970,127 | B2 * | 11/2005 | Rakib | 341/173 |
| 7,200,639 | B1 * | 4/2007 | Yoshida | 709/208 |
| 7,237,029 | B2 * | 6/2007 | Hino et al. | 709/227 |
| 7,260,597 | B1 * | 8/2007 | Hofrichter et al. | 709/200 |
| 2001/0034754 | A1 * | 10/2001 | Elwahab et al. | 709/201 |
| 2002/0019984 | A1 * | 2/2002 | Rakib | 725/111 |
| 2002/0032907 | A1 * | 3/2002 | Daniels | 725/51 |
| 2002/0038358 | A1 * | 3/2002 | Sweatt et al. | 709/218 |
| 2002/0046407 | A1 * | 4/2002 | Franco | 725/110 |
| 2002/0059637 | A1 * | 5/2002 | Rakib | 725/119 |
| 2002/0151327 | A1 * | 10/2002 | Levitt | 455/556 |
| 2002/0174430 | A1 * | 11/2002 | Ellis et al. | 725/46 |
| 2003/0031456 | A1 * | 2/2003 | Vogel | 386/35 |
| 2003/0141987 | A1 * | 7/2003 | Hayes | 340/825.72 |
| 2003/0190149 | A1 * | 10/2003 | Chang et al. | 386/83 |
| 2003/0217167 | A1 | 11/2003 | Hirose | |
| 2004/0174863 | A1 * | 9/2004 | Caspi et al. | 370/352 |
| 2005/0120096 | A1 * | 6/2005 | Rekimoto et al. | 709/220 |
| 2005/0278737 | A1 * | 12/2005 | Ma et al. | 725/40 |
| 2006/0133392 | A1 * | 6/2006 | Ajitomi et al. | 370/401 |
| 2006/0146837 | A1 * | 7/2006 | Atsuki et al. | 370/400 |

FOREIGN PATENT DOCUMENTS

| | | |
|---|---|---|
| JP | 2001-145140 | 5/2001 |
| JP | 2002-204486 | 7/2002 |
| JP | 2002-351756 | 12/2002 |
| JP | 2003-005823 | 1/2003 |
| WO | 97/18636 | 5/1997 |

OTHER PUBLICATIONS

U.S. Appl. No. 10/152,635; Drawings Whole Document; 17 pages.*
English Language Abstract of JP 2001-145140.
English Language Abstract of JP 2002-204486.
English Language Abstract of JP 2003-005823.
English Language Abstract of JP 2002-351756.
English Language Abstract of JP 9-319687.
U.S. Appl. No. 10/530,479 to Hirose et al., filed on Apr. 6, 2005.
U.S. Appl. No. 10/530,478 to Hirose et al., filed on Apr. 6, 2005.
U.S. Appl. No. 10/550,630 to Hirose et al., filed on Sep. 26, 2005.

* cited by examiner

PRIOR ART

REMOTE CONTROL SYSTEM AND REMOTE CONTROL METHOD

TECHNICAL FIELD

The invention relates to a remote control system which controls an in-home device from an external device located at a remote place through a network and a control method therefor.

BACKGROUND ART

As one of conventional techniques that control in-home devices (to be referred to as a "controlled device" hereinafter) through the Internet, a method of timer recording of TV programs in a video recorder which is a device to be controlled, from a terminal device such as a personal computer (PC) or a mobile telephone by using an electronic program guide (EPG) stored in a server which is connected to the network is known (for example, see JP 2001-145140 A).

In the above system, in order to make it possible to remotely control an in-home controlled device from a terminal at a remote place by using a browser function of the terminal, a WEB screen to be displayed on a terminal device in a server depending on a function held by the controlled device must be formed. For this purpose, each time a novel controlled device is developed, software in the server must be changed in accordance with the controlled device.

A conventional remote control system will be described by using FIG. 7.

A device 100 is a device that can be remote-controlled through a network, and as an example, a home video recording device is known. The device 100 includes a communication controller 101 which performs communication through the Internet, a device type number storage section 102 which stores a number representing a device type, and a device controller 103 which actually operates the device 100.

A server 110 includes a communication controller 112 which communicates with the Internet, a device data analyzer 114 which reads a number representing a device type from the device type number storage section 102 to generate WEB display data required for device control, a WEB display data generator 113 which forms WEB display data to be added to the WEB display data generated by the device data analyzer 114 and required for device control and completes a screen on which an internet service for arranging the appearance of a WEB display is performed, and a communication controller 111 which performs communication through the Internet.

A remote terminal 120 is a remote operation terminal such as a PC or a mobile telephone which displays a WEB (World Wide Web) by using a browser function and which performs an operation or inputting on the basis of the WEB screen. The remote terminal 120 includes a communication controller 121 for performing communication through the Internet, a WEB display section 122 for displaying a WEB screen, and an operation section 123 for performing an operation or inputting on the basis of the WEB screen.

In the remote control system, when the device 100 is controlled from a remote place by using the remote terminal 120, a user operates the device 100 while watching a screen displayed on the remote terminal 120 to designate the device 100. The device 100 is operated and controlled in accordance with an instruction of the user who operates the remote terminal 120. At this time, data (WEB display data) for displaying a screen displayed on the remote terminal 120 is generated by the WEB display data generator 113 of the server 110. In the WEB display data, display data unique to a device related to an operation of the device 100 is generated by the device data analyzer 114. The device data analyzer 114 reads a number representing a device type stored in the device 100 from the device type number storage section 102 through the Internet to generate display data depending on the device type.

The function of the server 110 is realized by executing a predetermined program. More specifically, the function of the device data analyzer 114 is also realized by executing a predetermined program. Conventionally, each process (step) depending on a device type is described in a program itself related to the function of the device data analyzer 114. More specifically, in the program, processes about all device types with which the server 110 can cope must be described in the program. For this reason, each time a novel device is developed, the entire program in the server must be changed in accordance with the device.

FIG. 8 shows a description example of an algorithm of the program described above.

A number which represents the device type and is read from the device type number storage section 102 is checked (S51). When the device type is "A", a step related to the device type "A" is executed (S52). More specifically, an HTML (Hyper Text Markup Language) data which designates a name "recording mode" as an item name to be displayed on the WEB is generated. An appropriate HTML text is generated to provide a display capable of selecting an option necessary for the item, such as "XP" or "SP".

When the device type is "B", a step related to the device item "B" is executed (S52). More specifically, a "recording mode" and a "recording media" are designated as item names, and an appropriate HTML text is generated to provide a display capable of displaying several options for each of the items.

As described above, information related to all the devices with which the server can cope is described in a program corresponding to the device data analyzer 114. For this purpose, when the number of devices or the number of functions of a device increases, new steps for the program must be added.

With the above configuration, the program of the server, in particular, a program corresponding to the device data analyzer must be changed each time a device having a new function is developed. For this reason, not only the controlled device but also the server must be developed and tested at once. This inhibits shortening of a development period or a reduction in development cost.

DISCLOSURE OF THE INVENTION

It is an object of the present invention to provide a remote control system which can flexibly cope with a screen for remote operation displayed on a terminal changing according to development of a novel controlled device or an extension of a controlled device, and a control method thereof.

A first remote control system according to the invention is a remote control system which includes a controlled device capable of being controlled through a network and a remote control device which transmits control information based on a user instruction provided on a terminal to the controlled device through the network. The controlled device includes a communication controller that communicates with the network and a device type storage section that stores device type information representing a type of the controlled device. The remote control device includes a communication controller which communicates with the network, a device type decision section that reads device type information from the device type storage section of the controlled device, a device unique data storage section that stores device unique data which is information unique to the controlled device, and a device data analyzer that generates data necessary for generating a WEB screen on the basis of the device unique data and device type information, and a WEB display data generator that generates a WEB screen on the basis of the data generated by the device data analyzer. The device data analyzer extracts data unique to the controlled device on the basis of the read device type information, from the device unique data stored in the device unique data storage section. The WEB display data generator generates WEB display data on the basis of the extracted unique data, and transmits the WEB display data to the terminal through the communication controller.

A second remote control system according to the invention is a remote control system which includes a controlled device capable of being controlled through a network and a remote control device which transmits control information based on a user instruction provided on a terminal to the controlled device through the network. The controlled device includes a communication controller that communicates with the network and a device unique data storage section that stores device unique data which is information unique to the controlled device. The remote control device includes a communication controller that communicates with the network, a device data memory that receives the device unique data from the device unique data storage section of the controlled device through the communication controller, and stores the device unique data, a device data analyzer that generates data necessary for a WEB screen on the basis of the device unique data stored in the device data storage section, and a WEB display data generator that generates a WEB screen from the data generated by the device data analyzer, and transmits the WEB screen to the terminal through the communication controller.

A first remote control method according to the invention is a remote control method for a remote control system including a controlled device capable of being controlled through a network and a remote control device which transmits control information based on a user instruction provided on a terminal to the controlled device through the network. The remote control method includes storing device type information representing a type of the controlled device in the controlled device, reading the stored device type information from the controlled device, storing device unique data which is information unique to the controlled device in the remote control device, extracting device unique data from the stored device unique data on the basis of the read device type information, and generating WEB display data on the basis of the extracted device unique data to transmit the WEB display data to the terminal.

A second remote control method according to the invention is a remote control method for a remote control system including a controlled device capable of being controlled through a network and a remote control device which transmits control information based on a user instruction provided on a terminal to the controlled device through the network. The remote control method includes storing device unique data which is information unique to the controlled device in the controlled device, receiving the stored device unique data, and generating a WEB display data on the basis of the received device unique data to transmit the WEB display data to the terminal.

The controlled device may be a video recording device which records a received broadcast program. In this case, the device unique data is information related to a recording operation.

According to the present invention, in a server, a program which realizes functions of the server and data unique to a controlled device are separately stored, and WEB display data is formed on the basis of a number representing a device type obtained from the controlled device. In this manner, the server can flexibly cope with a change in operation screen caused by a difference between functions of controlled devices without changing a program for executing the functions of the server, and shortening of a development period and a reduction in development cost can be achieved.

BEST MODE FOR CARRYING OUT THE INVENTION

FIRST EMBODIMENT

Figure 1:
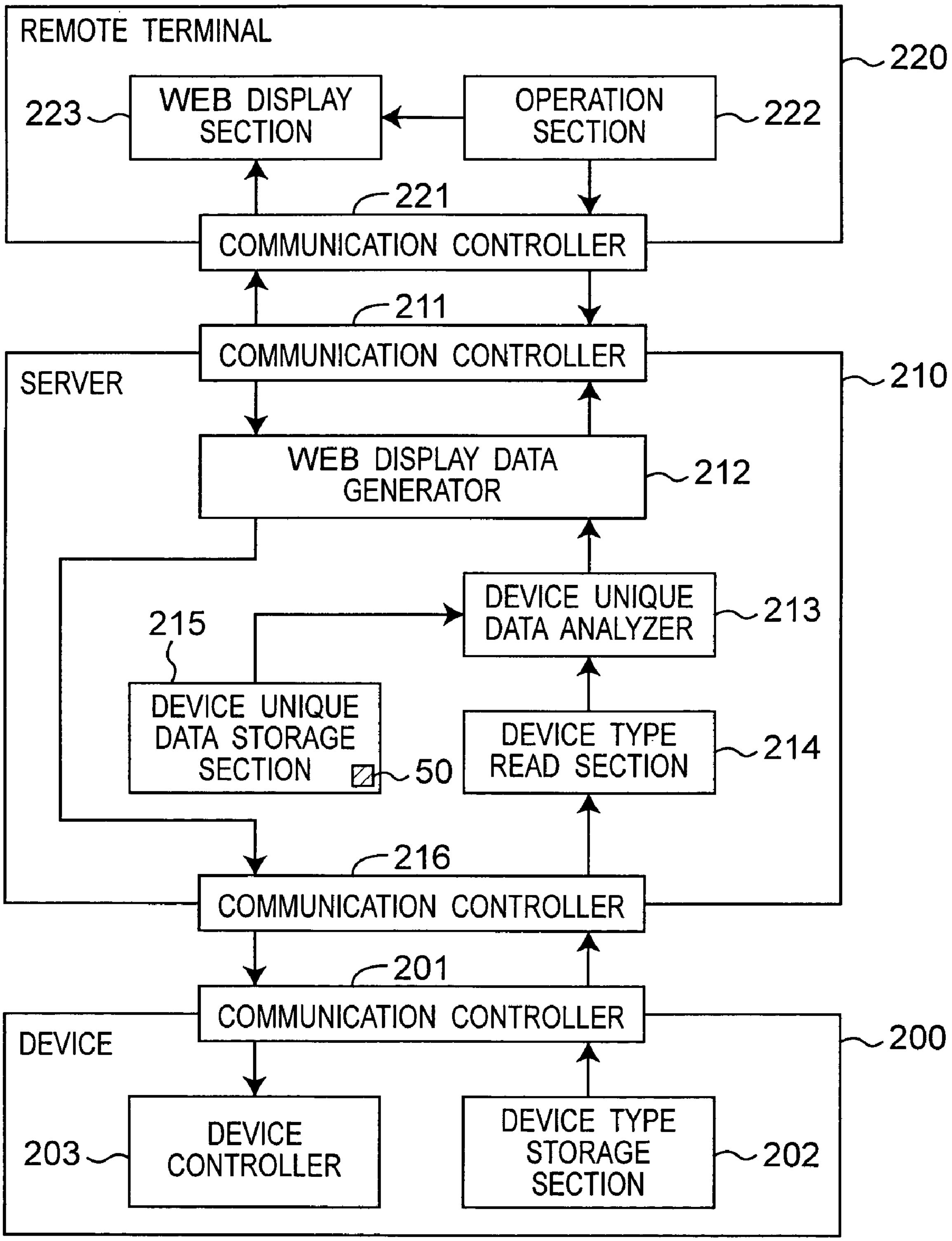
FIG. 1 is a block diagram showing a configuration of a remote control system according to a first embodiment of the present invention.

FIG. 1 is a block diagram showing a configuration of a remote control system according to a first embodiment of the present invention.

The remote control system according to the embodiment includes a device 200, a server 210, and a remote terminal 220. The device 200, the server 210, and the remote terminal 220 are connected to each other through a communication network such as the Internet.

The functions (to be described later) of the device 200, the server 210, and the remote terminal 220 are realized by a CPU or the like executing predetermined programs in the respective devices and the terminal.

The device 200 is a controlled device which can be remotely controlled from the remote terminal 220 through the Internet, and is a video recording device such as a DVD recorder which can record a program received from a broadcast station in the embodiment. The device 200 includes a communication controller 201 to perform communication through the Internet, a device type storage section 202 which stores a number representing a device type, and a device controller 203 to actually operates the device 200.

The remote terminal 220 is a remote operation device such as a PC or a mobile telephone which displays a WEB screen by using a browser function and performs an operation or inputting on the basis of the WEB screen. The remote terminal 220 includes a communication controller 221 to communicate with the server 210 through the Internet, a WEB display section 223 to display a WEB screen, and an operation section 222 which makes it possible to perform an operation or inputting by a user on the basis of the WEB screen.

The server 210 has functions for generating a WEB screen to be displayed on the remote terminal 220 and transmitting control information from the remote terminal 220 to the device 200. The server 210 includes a communication controller 216 which communicates with the device 200 through the Internet, a device type read section 214 which reads a number representing a device type from the device type storage section 202 of the device 200 and stores the number therein, and a device unique data storage section 215 which stores device unique data 50 including information such as operation items unique to the device and selective items. The details of the device unique data will be described later.

The server 210 further includes a communication controller 211, a WEB display data generator 212, and a device data analyzer 213.

The device data analyzer 213 reads a number representing a device type read by the device type read section 214 and data in the device unique data storage section 215, and generates WEB display data necessary for device control. The WEB display data generator 212 generates WEB display data for displaying the data which is necessary for device control and generated by the device data analyzer 213 and generates WEB display data for displaying a screen for providing an internet service such as arrangement of the appearance of the WEB display. The communication controller 211 communicates with the remote terminal 220 through the Internet.

The device unique data stored in the device unique data storage section 215 of the server 210 will be described below.

Figure 2:
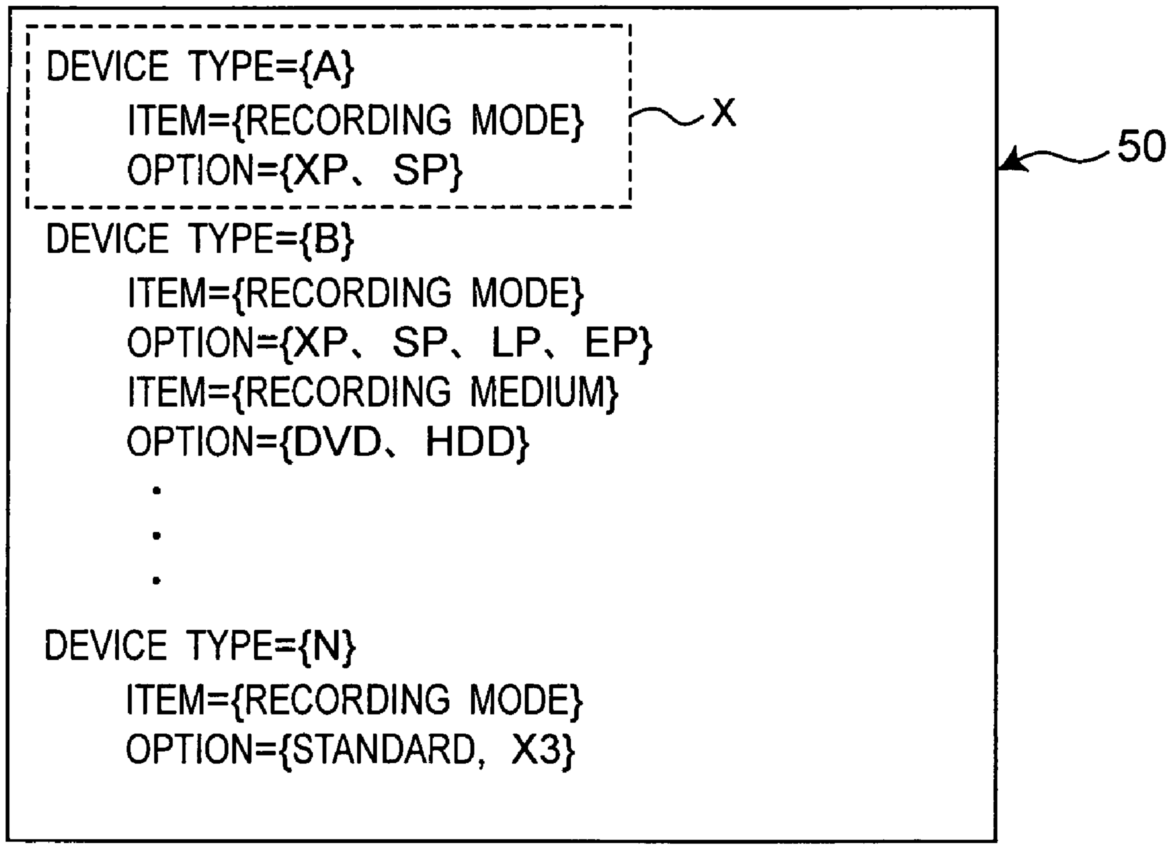
FIG. 2 is a diagram showing an example of device unique data in the remote control system.

FIG. 2 shows an example of the device unique data. The device unique data 50 is data including only information specific to the device, which is provided independently of an executed program for realizing the functions of the server 210. The device unique data is described with the type of device, the item names of control items necessary for operating/controlling the device, and options necessary depending on the items. The device unique data may include other kinds of information as information unique to the controlled device. In FIG. 2, items necessary for timer recording and options therefor are shown as examples. An item "recording mode" necessary for timer recording designates a recording speed. For example, it is shown that "XP" or "SP" must be selected for device A, and that "LP" or "EP" can further be selected in another device B. Only a "recording mode" is described as an item name in device A, while a "recording medium" is also described as an item name in device B. It is shown in device B that "DVD" or "HDD" must be selected as a recording medium.

"XP", "SP", "LP", and "EP" shown as the selections of the recording mode in FIG. 2 are symbols representing recording speeds (recording times). For example, when a DVD-RAM (9.4 GB in both sides) is used, "XP" is for 2 hours, "SP" for 4 hours, "LP" for 8 hours, and "EP" for 12 hours. "DVD" and "HDD" shown as options of recording medium are abbreviations of a digital versatile disk and a hard disk drive, respectively.

With respect to an operation of the remote control system according to the embodiment, an operation for timer recording of the device 200 located at a remote place from the remote terminal 220 through the Internet will be described below.

Referring to FIG. 1, when a user starts an operation for timer recording on the remote terminal 220, the server 210 receives an instruction indicating operation start from the remote terminal 220, generates a WEB screen for timer recording by the WEB display data generator 212, and transmits the WEB screen to the remote terminal 220. The WEB screen is displayed on the WEB display section 223 of the remote terminal 220. The user performs the operation while watching the screen. The device 200 is operated and controlled in accordance with instructions by the user who operates the remote terminal 220.

At this time, in the server 210, although data for displaying the WEB screen is generated by the WEB display data generator 212, in this data, device unique data related to setting of the device 200 is generated by the device data analyzer 213. The device unique data representing the functions or the like of the device 200 is stored in the device unique data storage section 215. A number representing a device type is transmitted from the device type storage section 202 of the device 200 to the device type read section 214 of the server 210 through the Internet. In the device data analyzer 213, with reference to the device unique data 50 stored in the device unique data storage section 215, display data according to the device type is generated on the basis of a number representing the device type stored in the device type read section 214.

Figure 3:
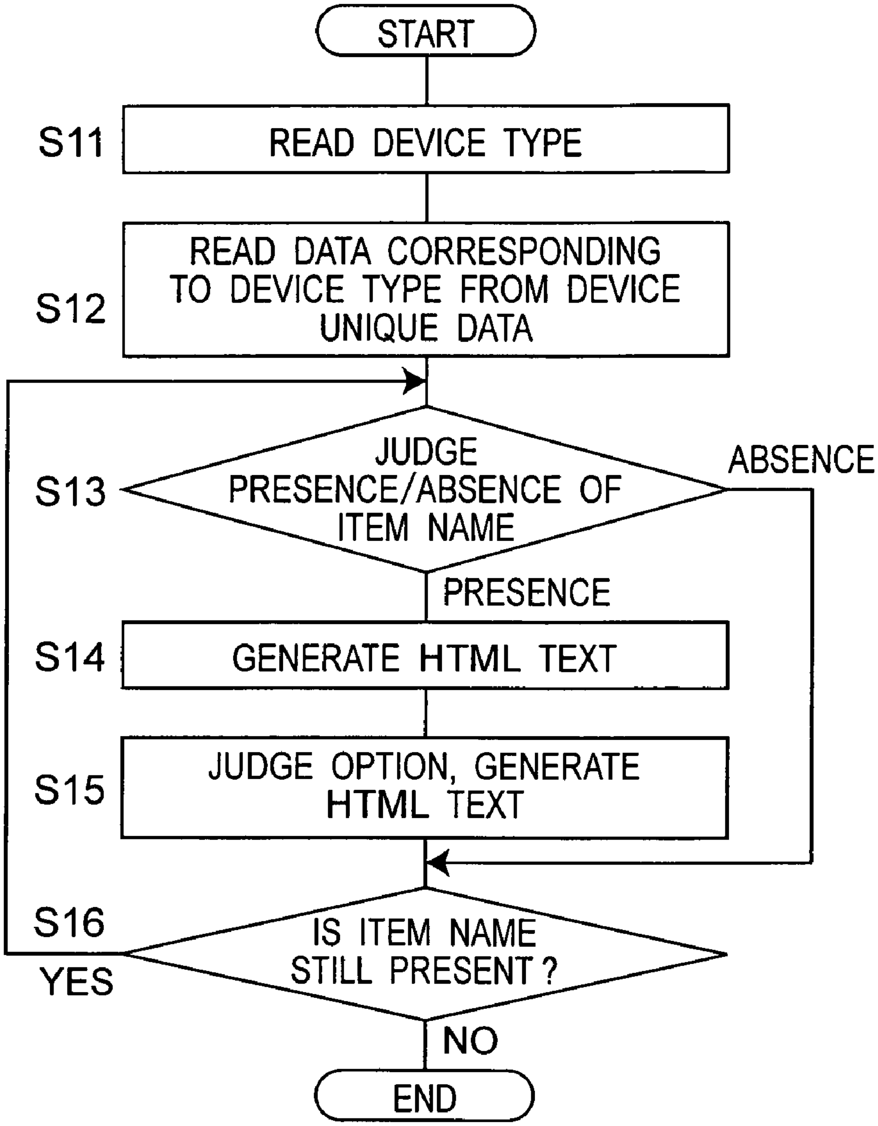
FIG. 3 is a flow chart showing processes of a device data analyzer in the remote control system according to the first embodiment.

The details of the above operation of the device data analyzer 213 will be described below. FIG. 3 shows an example description (flow chart) of an algorithm related to the operation of the device unique data analyzer 213.

The device unique data analyzer 213 reads a device type number from the device type read section 214 (S11). The device data analyzer 213 refers to the device unique data 50 stored in the device unique data storage section 215, and reads a description of a part corresponding to the read device type number in the description of the device unique data 50 (S12). For example, when the device type number is "A", in the example in FIG. 2, a part represented by a broken line X, that is, two lines "including item={recording mode}" and "option={XP,SP}" are read.

Figure 4:
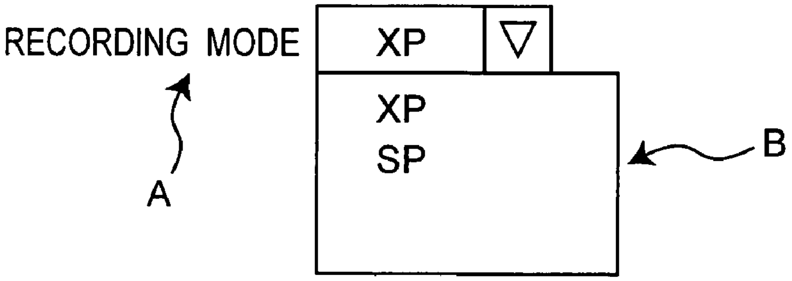
FIG. 4 is a diagram showing a part of an operation screen for setting a recording mode displayed on a remote terminal.

An item name is checked (S13), and HTML text to display an item "RECORDING MODE" is generated (S14). For example, an HTML text is generated such that an item name is displayed as indicated by "A" in FIG. 4. The option is next checked, and HTML text to provide a display for selection of two items is generated (S15). For example, HTML text is generated such that options are displayed as indicated by "B" in FIG. 4. In the check in step S13, if no item name is described in the device unique data 50, the processes are finished.

The presence/absence of the description of the item name is checked (S16). The processes are repeated until no item name to be described exists (S13-S16). In this manner, HTML text describing necessary item names and necessary options is generated.

With the above configuration, when a device having a new function is developed, a description related to the device may just be added to the device unique data 50. Since this operation can be easily performed, unlike in a conventional technique, a change in the device unique data analyzer 213 which requires an extraordinary operation need not be performed. Therefore, a novel device can be developed without considering operations on the server side, and a user can be devoted to development of the device. Further, shortening of development period and a reduction in development cost can be achieved in the entire system.

In the above explanation, the device unique data is displayed associating item names (items) with options. However, items may be displayed hierarchically or displayed in association with each other.

SECOND EMBODIMENT

In the first embodiment, device unique data is stored in the server. In the second embodiment, device unique data is stored in a controlled device. Also in the configuration, the same effect as that in the first embodiment can be obtained.

Figure 5:
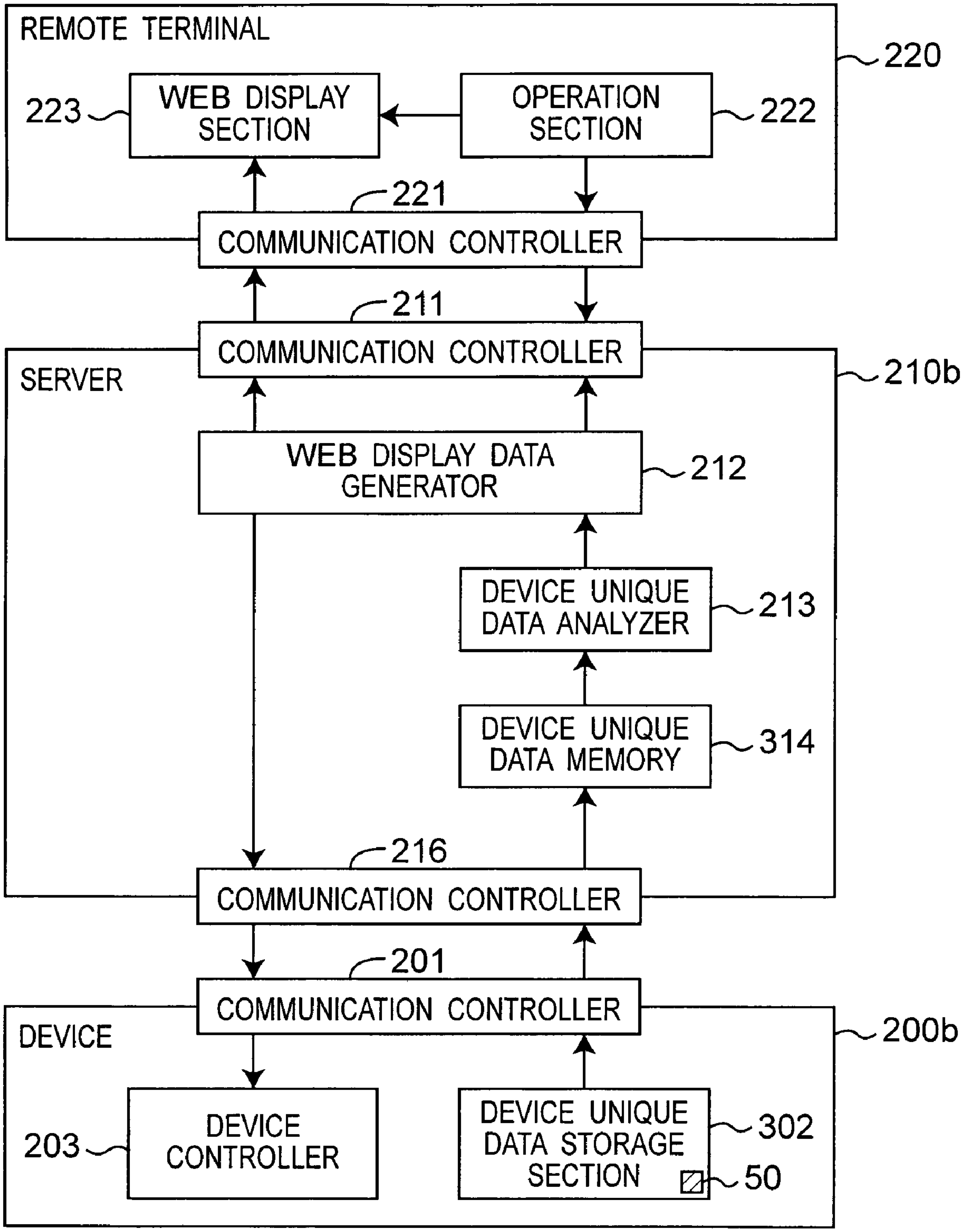
FIG. 5 is a block diagram showing a configuration of a remote control system according to a second embodiment of the present invention.

FIG. 5 is a block diagram showing a configuration of a remote control system according to the embodiment. In the remote control system of the embodiment is different from that of the first embodiment in the configurations of the server and the controlled device.

A device 200*b* in the embodiment has a configuration obtained by removing the device type storage section 202 and adding a device unique data storage section 302 in the configuration of the device 200 of the first embodiment. The device unique data storage section 302 stores device unique data. A data description format of the device unique data is as shown in FIG. 2. In this case, information related to all device types need not be described, and it is enough that only information related to the device 200*b* itself is described.

A server 210*b* according to the embodiment has a configuration obtained by removing the device type read section 214 and the device unique data storage section 215 from the configuration of the server 210 in the first embodiment and adding a device unique data memory 314 to the configuration. The device unique data memory 314 reads device unique data 50 from the device 200*b* to store the device unique data 50. A device data analyzer 313 analyzes device unique data stored in the device unique data memory 314 to generate WEB display data necessary for device control.

Figure 6:
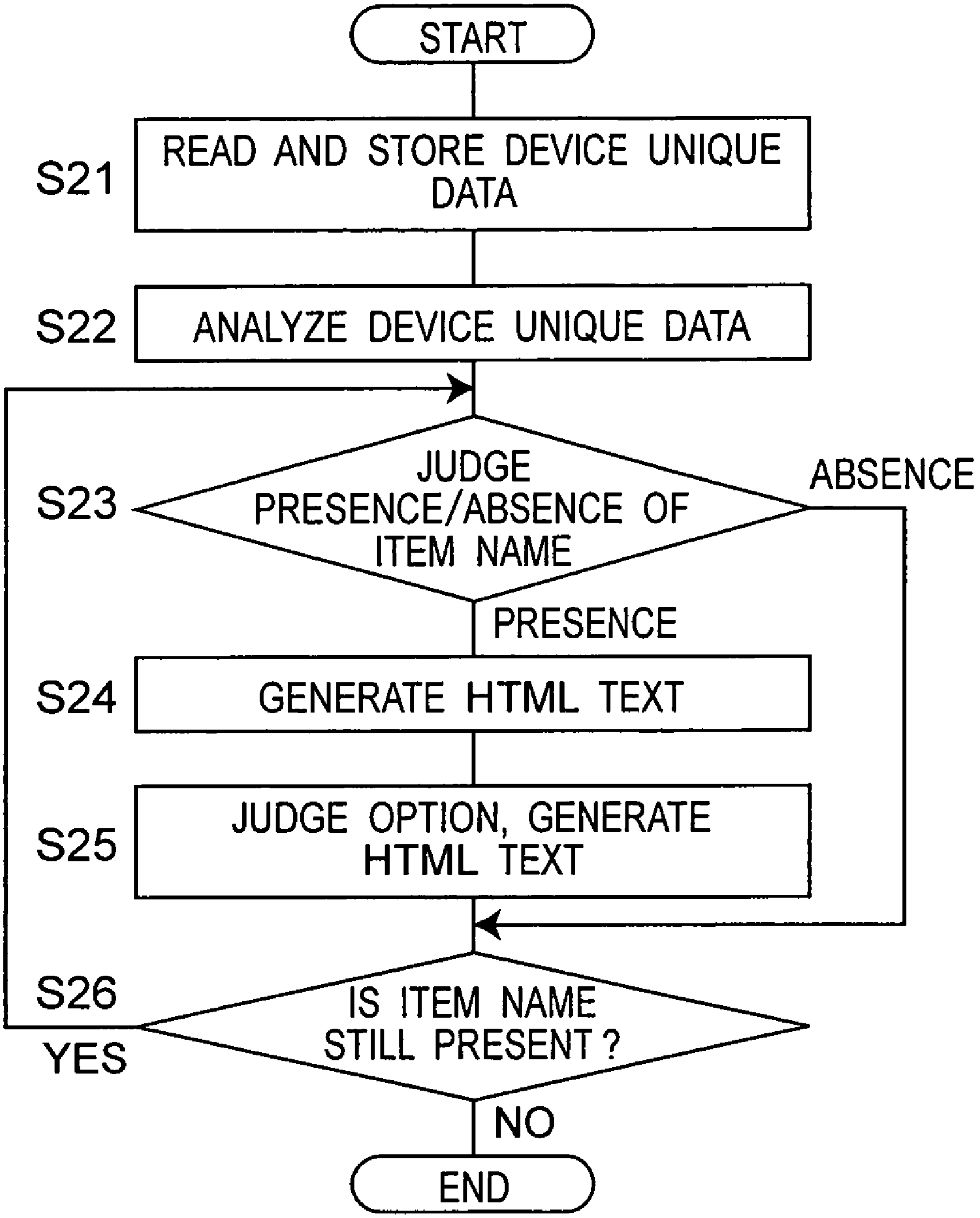
FIG. 6 is a flow chart showing processes of a device data analyzer in the remote control system according to the second embodiment.
Figure 7:
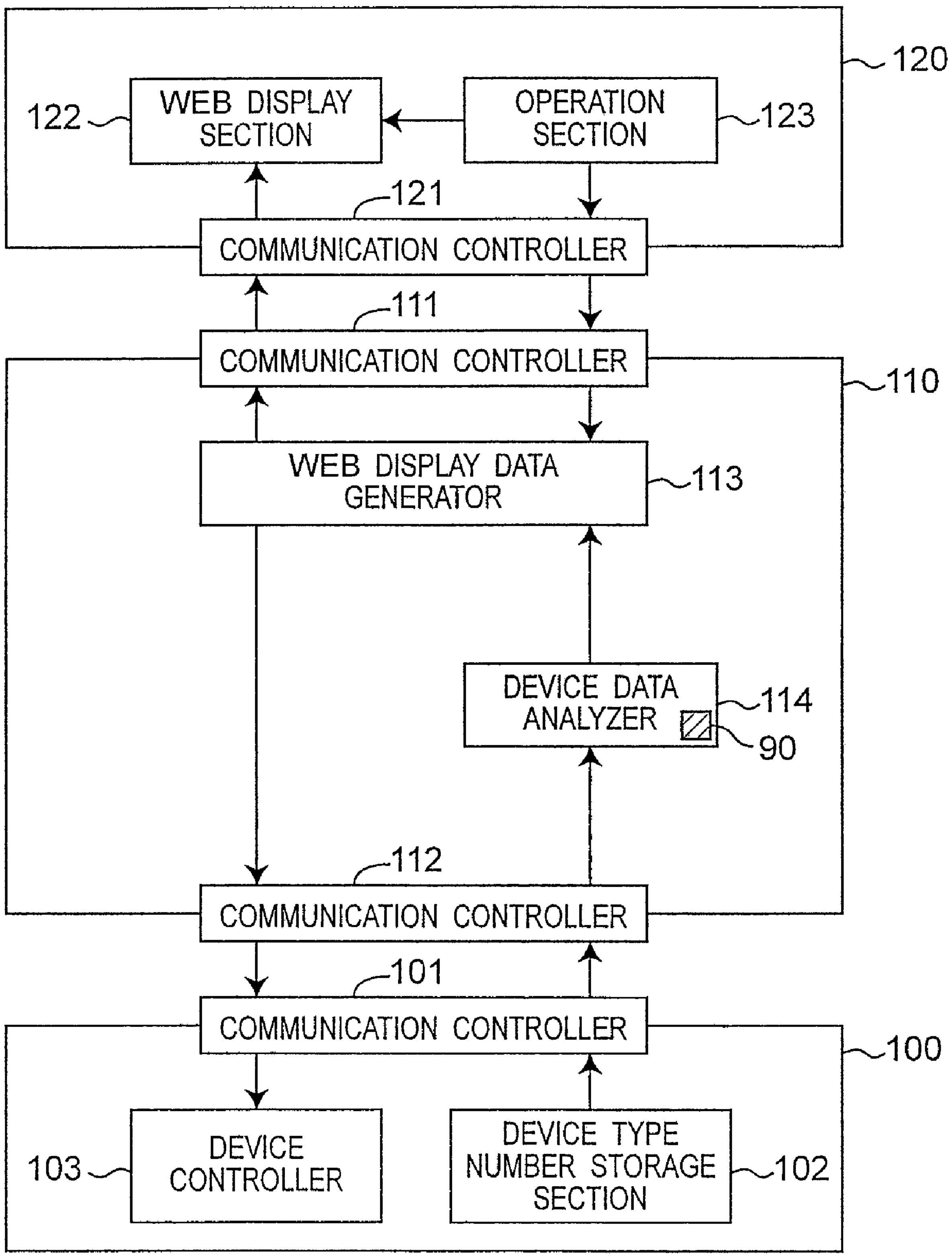
FIG. 7 is a block diagram showing a configuration of a conventional remote control system.
Figure 8:
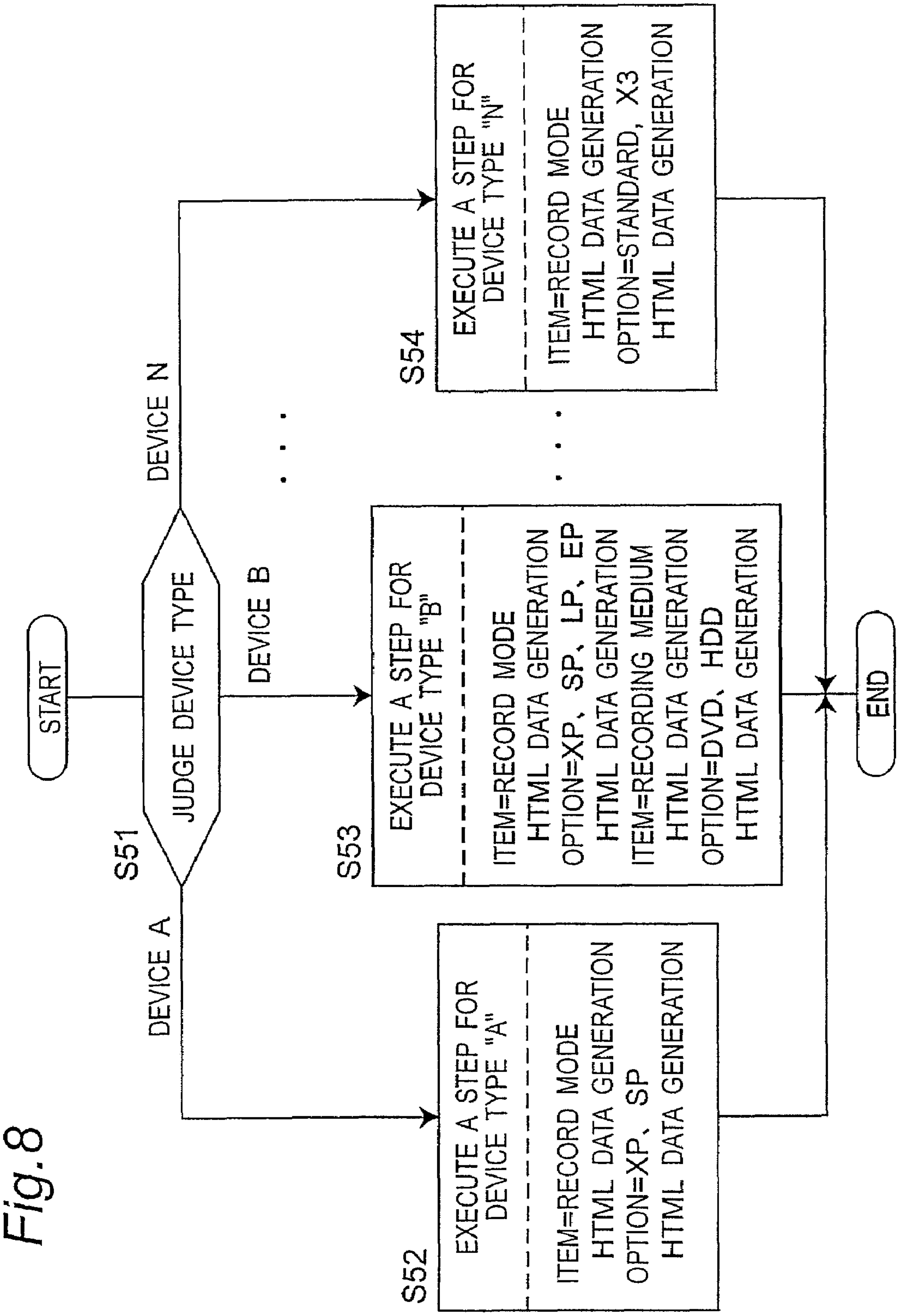
FIG. 8 is a flow chart showing processes in the conventional remote control system.

With reference to the flow chart in FIG. 6, an operation of the server 210*b* according to the embodiment will be described below.

The device unique data memory 314 reads the device unique data 50 stored in the device unique data storage section 302 from the device 200*b* to store the device unique data 50 (S21). The device unique data analyzer 213 reads the device unique data from the device unique data memory 314, analyzes the device unique data (S22), and generates HTML text by the same processes as those in steps S13 to S16 of the flow chart in FIG. 3 (S23 to S26).

As described above, according to the embodiment, since the device unique data is stored on the device side, when a novel device is developed or the functions of the device are extended or changed, only the device may be changed in accordance with the development, the extension, and the change. The server need not be changed in accordance with the development of a device, the extension of functions, and the like. Thus, a load on management of the server is reduced.

In the above embodiment, information necessary for timer recording is described as the device unique data. However, the present invention is not limited to this configuration, another information necessary for control of operation of devices can be described as a matter of course.

The present invention has been described with respect to the specific embodiment. However, other many modifications and changes and other applications are apparent to persons skilled in the art. Therefore, the present invention is not limited to the specific disclosure herein and can be limited by only the accompanying spirit and scope of the invention. This application is related to Japanese Patent Application No. 2003-88422 (filed on Mar. 27, 2003), the content of which is incorporated herein by reference.

The invention claimed is:

1. A remote control system which includes a controlled device capable of being controlled through a network and a remote controller which transmits control information based on a user instruction provided on a remote terminal, distinct from the remote controller, to the controlled device through the network, wherein a) the controlled device includes:

- a first communication controller that communicates with the network; and
- a device type storage that stores device type information representing a type of the controlled device, b) the remote controller includes:

- a second communication controller which communicates with the remote terminal and the remote controller over the network;
- a device type decisioner that receives the device type information from the device type storage of the controlled device which is designated by an instruction received from the remote terminal through the first and second communication controllers;
- a device specific data storage that stores device specific data which represents information of an operation specific to the controlled device and is provided independently of a program for realizing functions of the remote control system;
- a device data analyzer that generates data necessary for generating a WEB display on the basis of the device specific data stored in the device specific data storage and the device type information received by the device decisioner; and
- a WEB display data generator that generates WEB display data utilized to generate the WEB display, on the basis of the data generated by the device data analyzer, wherein the device data analyzer extracts data specific to the controlled device on the basis of the received device type information, from the device specific data stored in the device specific data storage; and the WEB display data generator generates the WEB display data on the basis of the specific data extracted by the device data analyzer, and transmits the WEB display data to the remote terminal through the second communication controller.

2. A remote control system which includes a controlled device capable of being controlled through a network and a remote controller which transmits control information based on a user instruction provided on a remote terminal, distinct from the remote controller, to the controlled device through the network, wherein a) the controlled device includes:

- a first communication controller that communicates with the network; and
- a device specific data storage that stores device specific data which represents information of an operation specific to the controlled device and is provided independently of a program for realizing functions of the remote control system, b) the remote controller includes:

- a second communication controller that communicates with the remote terminal and the remote controller over the network;
- a device data memory that receives the device specific data from the device specific data storage of the controlled device which is designated by an instruction received from the remote terminal through the first and second communication controllers, and stores the device specific data;

a device data analyzer that generates data necessary for generating a WEB display on the basis of the device specific data stored in the device specific data storage; and a WEB display data generator that generates WEB display data utilized to generate the WEB display, on the basis of the data generated by the device data analyzer, and transmits the WEB display data to the remote terminal through the second communication controller.

3. The remote control system according to claim 1, wherein the controlled device comprises a video recorder which records a received broadcast program.

4. The remote control system according to claim 3, wherein the device specific data comprises information related to a recording operation.

5. A remote control method for a remote control system including a controlled device capable of being controlled through a network and a remote controller which transmits control information based on a user instruction provided on a remote terminal, distinct from the remote controller, to the controlled device through the network, the remote control method comprising:

storing device type information representing a type of the controlled device in the controlled device;

receiving the stored device type information from the controlled device;

storing device specific data which represents information of an operation specific to the controlled device in the remote controller which is provided independently of a program for realizing functions of the remote control system;

extracting data specific to the controlled device from the stored device specific data on the basis of the received device type information, by the remote controller;

generating WEB display data utilized to generate a WEB display, on the basis of the extracted specific data, by the remote controller; and transmitting the WEB display data to the remote terminal, by the remote controller.

6. A remote control method for a remote control system including a controlled device capable of being controlled through a network and a remote controller which transmits control information based on a user instruction provided on a remote terminal, distinct from the remote controller, to the controlled device through the network, the remote control method comprising:

storing device specific data which represents information of an operation specific to the controlled device in the controlled device and which is provided independently of a program for realizing functions of the remote control system;

receiving the stored device specific data from the remote control system, by the remote controller;

generating a WEB display data utilized to generate a WEB display, on the basis of the received device specific data by the remote controller; and transmitting the WEB display data to the remote terminal by the remote controller.

7. The remote control method according to claim 5, wherein the controlled device comprises a video recorder which controls a recording operation of a received broadcast program.

8. The remote control method according to claim 7, wherein the device specific data comprises information related to the recording operation.

9. The remote control system according to claim 2, wherein the controlled device comprises a video recorder which records a received broadcast program.

10. The remote control system according to claim 9, wherein the device specific data comprises information related to a recording operation.

11. The remote control method according to claim 6, wherein the controlled device comprises a video recorder which controls a recording operation of a received broadcast program.

12. The remote control method according to claim 11, wherein the device specific data comprises information related to the recording operation.

* * * * *

UNITED STATES PATENT AND TRADEMARK OFFICE

CERTIFICATE OF CORRECTION

PATENT NO. : 7,617,009 B2
APPLICATION NO. : 10/550614
DATED : November 10, 2009
INVENTOR(S) : Hirose et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 53 days.

Signed and Sealed this

Nineteenth Day of October, 2010

David J. Kappos

*Director of the United States Patent and Trademark Office*